United States Patent [19]

McLagan

[11] 3,820,419

[45] June 28, 1974

[54] METHOD OF REDUCING STRESS CONCENTRATION AND CRACKING FAILURES IN CARBIDE TIPPED SAWS

[75] Inventor: Erman R. McLagan, Corvallis, Oreg.

[73] Assignee: The McLagan Co., Corvallis, Okla.

[22] Filed: Aug. 8, 1973

[21] Appl. No.: 386,832

Related U.S. Application Data

[63] Continuation-in-part of Ser. No. 223,987, Feb. 7, 1972, abandoned.

[52] U.S. Cl............................ 76/112, 29/90 A, 76/26
[51] Int. Cl.............................................. B23d 63/00
[58] Field of Search ............. 76/112, 101 A, 25, 26, 76/27; 29/90 A

[56] References Cited
UNITED STATES PATENTS 3,199,171  8/1965   Hellman et al. ................... 29/90 A
3,205,556  9/1965   Romans ............................. 29/90 A Primary Examiner—Leonidas Vlachos
Attorney, Agent, or Firm—Klarquist, Sparkman, Campbell, Leigh, Hall & Whinston

[57] ABSTRACT

Stress concentration and cracking failures in the tooth and gullet regions of carbide-tipped saws are eliminated by heating the saw after the carbide tips have been silver soldered thereto to a temperature above the temperature at which the plate hardness is reduced to a hardness at which glass bead peening can achieve penetration of the surface metal and then simultaneously glass bead peening the edge and opposite sides of the saw in the peripheral region thereof.

5 Claims, 3 Drawing Figures

ROCKWELL C (R_c)
HARDNESS PROFILE

PATENTED JUN 28 1974 3,820,419
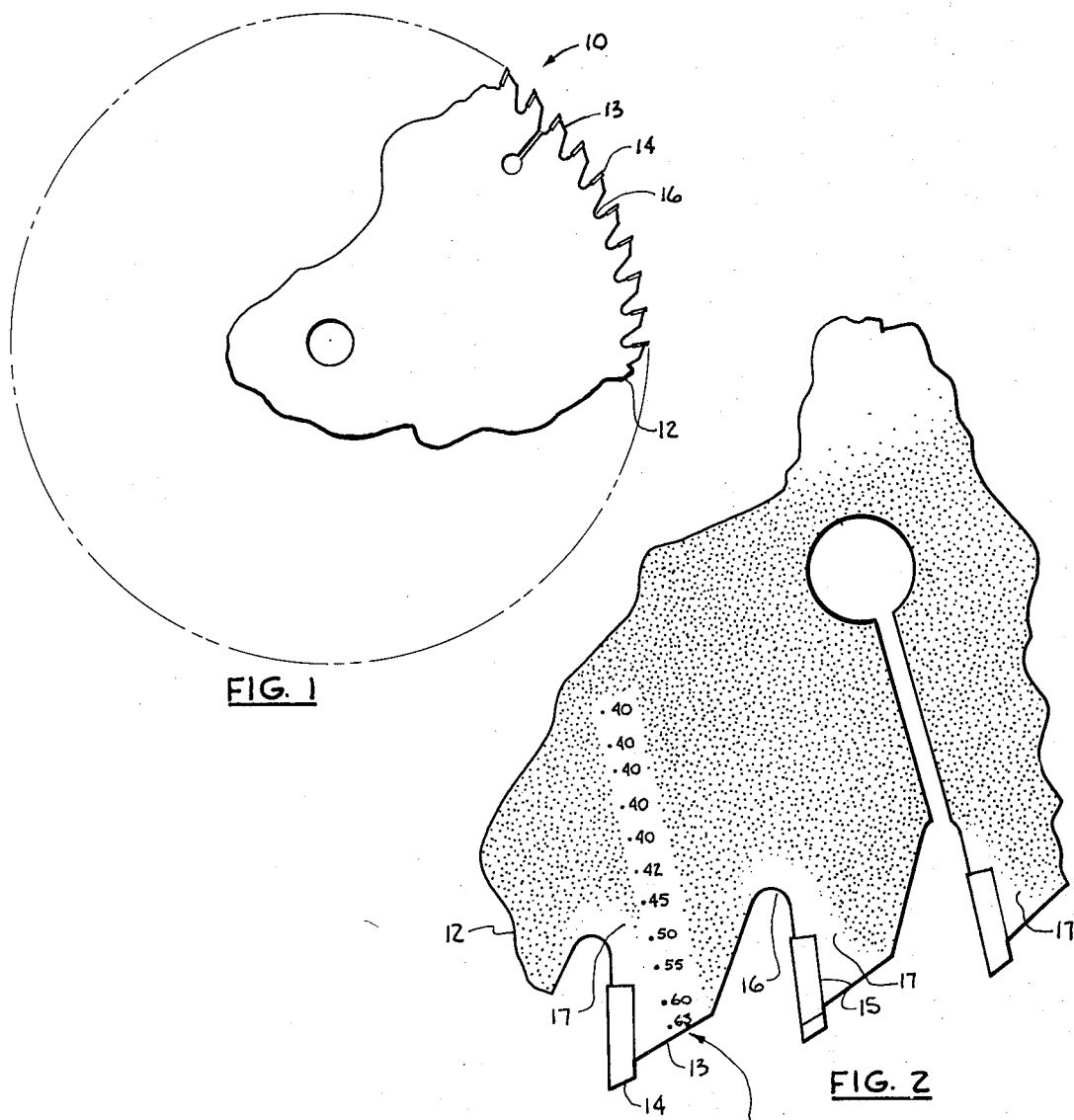
FIG. 1
FIG. 2
ROCKWELL C (Rc)
HARDNESS PROFILE
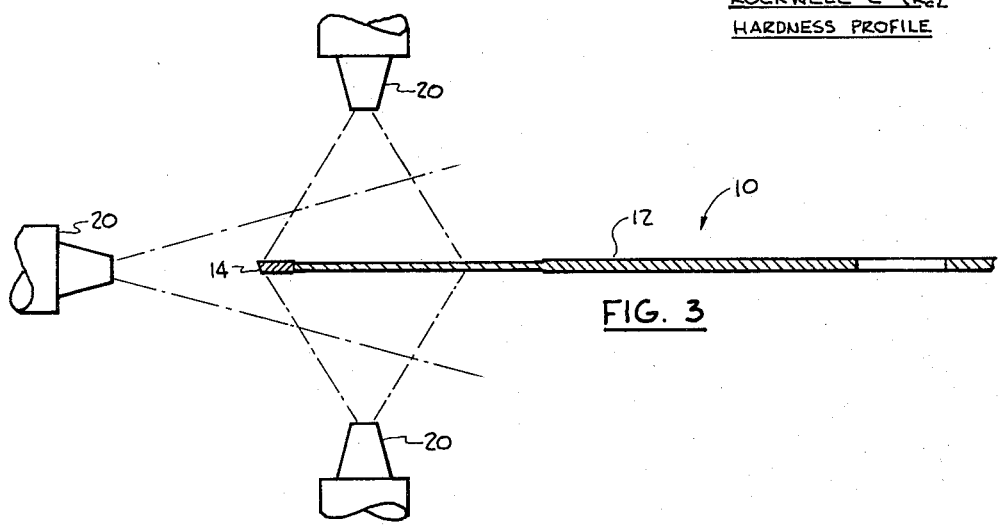
FIG. 3

METHOD OF REDUCING STRESS CONCENTRATION AND CRACKING FAILURES IN CARBIDE TIPPED SAWS

This application is a continuation-in-part of my prior co-pending application, Ser. No. 223,987, filed Feb. 7, 1972, and now abandoned.

BACKGROUND OF THE INVENTION

This invention relates to the reduction of stress concentration and cracking failures in carbide-tipped saws and, more particularly, to a method of heat treating and subsequently glass bead peening such saws to eliminate such failures in the gullet and tooth regions thereof.

In the manufacture of carbide-tipped saws, a steel plate punched generally in the configuration of the saw profile is surface ground. Carbide tips are then silver soldered or brazed into pockets cut in the teeth. The carbide tips are ground to complete the product.

Surface grinding, however, induces a residual surface tension in the steel plate. This tension exists to a depth equal to several thousandths of an inch below the surface. The silver soldering or brazing of the carbide tips to the plate teeth air hardens the steel in localized areas throughout the teeth and gullet regions, and this often results in achieving a hardness in these areas equal to the quench hardness of the steel. It is not unusual, for example, for a hardness equal to 63 Rockwell C to be achieved in a tooth, with a hardness gradient running from that value down to the tempered hardness of the plate in areas closer to its interior. The shape of the plate in the region of the gullet together with the hardening resulting from the aforementioned silver soldering or brazing of the carbide tips plus the residual tension induced in the surface metal as a result of the surface grinding all combine to make the teeth subject to breakage and the gullet regions particularly vulnerable to stress concentration or cracking failures.

Accordingly, it is the primary object of the present invention to provide a method of eliminating the aforementioned breakage and stress concentration and cracking failures in the manufacture of highly stressed metal parts having localized areas of excessive hardness caused during interim steps in the manufacturing process.

It is a further object of the present invention to provide a method of eliminating tooth breakage and stress concentration and cracking failures in the gullet regions in carbide-tipped circular saws which are subject to localized areas of excessive hardness achieved during the metal-joining of the carbide tips to the metal plate.

SUMMARY OF THE INVENTION

In its broadest sense, the invention provides a method of eliminating breakage and stress concentration and cracking failures in highly stressed metal parts having localized areas of excessive hardness caused during interim steps in the manufacture thereof. The method comprises heating the part to a temperature necessary to reduce the hardness of the part in the localized area to a point at which shot peening can achieve penetration of the metal in such localized area, and then shot peening the metal part at least in such area to relieve surface tension and to place the surface metal in a state of compression. The heating of the part is to a temperature above that at which the hardness of the metal is reduced to such hardness at which the aforementioned peening can achieve penetration of the metal in the localized area.

The shot peening desirably comprises glass bead peening. In such case, the heating of the part is to a temperature above that at which the hardness of the metal is reduced to a hardness at which such glass bead peening can achieve penetration of the metal in the theretofore localized excessively hard areas.

BRIEF DESCRIPTION OF THE DRAWINGS

FIG. 1 is a plan view of a carbide-tipped circular saw whose manufacture is desirably subject to the method of the present invention.

FIG. 2 is a detail view to an enlarged scale of the tooth and gullet region of the saw of FIG. 1 and illustrates the problems inherent in the manufacture thereof.

FIG. 3 is a schematic view of the glass bead peening apparatus used in the method.

DESCRIPTION OF THE PREFERRED EMBODIMENT

Referring to the drawings, FIG. 1 illustrates a carbide-tipped circular saw 10 whose manufacture is desirably subject to the method of the present invention. The saw 10 comprises a steel plate 12 having teeth 13 to which are metal-joined, as by silver soldering, carbide tips 14 which are subsequently precision ground to razor sharpness.

The steel plate 12 is typically a nickel saw steel. A typical composition includes 2.60% nickel, 0.35% manganese and between 0.70% and 0.80% carbon. A steel of this composition is preferably heat-treated by being uniformly heated to between 1,475° and 1,500° F., soaked through and quenched in oil to achieve a quench hardness of between 62 and 63 Rockwell C (Rc). The steel plate is then desirably tempered at a draw temperature of about 900° F. to achieve a plate hardness of between 38 and 40 Rc.

The plate 12 is then surface ground in a manner which is well known to the art. Such grinding, however, induces a residual surface tension in the plate. This tension exists to a depth equal to several thousandths of an inch below the surface and contributes to the stress concentration and breakage problem.

Pockets 15 are cut in the teeth 13 and the carbide tips 14 are then preferably silver soldered to the plate. Other forms of metal joining may be used to attach the carbide tips, including brazing and induction welding, although I have found silver soldering to be most desirable. The metal joining process, however, air hardens the steel in the teeth 13 and in the regions of the gullets 16. Such results in obtaining localized areas throughout the teeth and gullet regions having hardnesses equal to the quench hardness of the plate, e.g., 63 Rc, with a hardness gradient running from that value down to the 38–40 Rc obtaining in the balance of the plate. See FIG. 2, which schematically illustrates the problem above described.

Shot peening, and, preferably, glass bead peening, is effective in eliminating the problem caused by the induced surface tension and excessive hardness. Glass bead peening, however, is not possible where the metal is harder than 50 to 52 Rc. Peening in areas harder than this fails to achieve any penetration, and if such is attempted, a "print-out" 17 appears, wherein the metal exhibits a mat finish where the penetration has succeeded, but remains shiny in the areas of excessive hardness. Again, see FIG. 2.

Consequently, subsequent to the metal-joining of the carbide tips 14 to the plate 12, but prior to their grinding, I put the saw in an electric oven preheated to, for example, 500° F. An oven found suitable for the purpose is one manufactured by the Grieve Corporation, Chicago, Ill., Model AB-850. I set the oven control to a desired temperature, for example, between 800° and 950° F., and permit the temperature gradually to rise. Such takes a length of time depending upon the number of saws in the oven at one time, and is usually about 1 hour.

I permit the saws to remain in the oven at this desired temperature for approximately 20 minutes, which is enough time fully to heat the steel through.

The length of time that the saws remain in the heated oven is not critical. The temperature to which they are brought is determined by the final hardness desired and is a function of the chemistry of the steel. For a steel of the aforementioned composition and which is tempered at a draw temperature of about 900° F. to 38–40 Rc, an oven temperature of 800°–950° F. has been found satisfactory. The temperature selected is such that the plate hardness is reduced in those areas which were excessively hard to a hardness at which glass bead peening can achieve penetration of the steel surface. Thus, the lowest temperature to which the saws should be brought in the oven is that to which the hardness of the steel is reduced such that glass bead peening can achieve the necessary penetration in the localized areas of excessive hardness. The upper limit of the oven temperature is that which would produce a Rc hardness as required below the original temper hardness. For example, for the aforementioned steel, 950° F. would produce a hardness of 37–38 Rc.

After the saws have remained at the selected oven temperature for approximately 20 minutes, the oven is permitted slowly to cool to 500° F. before the saws are taken out. I find that a two hour period of reducing oven temperature is satisfactory. If desired, however, the saws can be left in the oven overnight to cool down. Depending upon the temperature selected this heating step reduces the hardness in the tooth and gullet regions to about 48 to 50 Rc or lower, which is a hardness at which glass bead peening is effective.

After removing the saws from the oven, they are dipped in an acid bath to loosen up the heat scale. A saw is then placed in a sand blast cabinet and subjected to glass bead peening by rotating it such that it can be peened simultaneously on its edge and on the peripheral regions on opposite sides of the plate. See FIG. 3. I use glass beads of size 801 manufactured by Zero Manufacturing Co., Washington, Mo., to Mil-6-9954A, Mil-STD-852(USAF). The saw must be peened simultaneously on both faces to prevent warping of the plate. Preferably the plate is rotated underneath nozzles 20 to peen approximately an area extending one and one-half inches radially inwardly from the peripheral edge of the saw. It is important not to overpeen, and I have found that peening for a number of seconds equal to three times the diameter of the saw (36 seconds for a 12 inch diameter saw) is a satisfactory length of time.

The peening is seen to be effective if no shiny spots or "print-out" 17 appears as indicated in FIG. 2. Stated otherwise, if the characteristic mat finish does not appear throughout the entire tooth and gullet areas peened, there was an insufficient reduction in hardness to permit the glass peening to take effect.

Reducing the hardness in the tooth and gullet regions prior to the glass bead peening permits the peening to achieve adequate surface compression throughout the peripheral regions of the saw and makes the gullet regions stress concentration and crack resistant and the teeth resistant to breakage. The peening relieves the surface tension caused by the surface grinding and achieves a desired surface compression throughout the peripheral region of the saw. It also takes care of any stresses induced by the punching of the plate profile. Prior to the present invention, cracking in the gullet regions of carbide tipped saws was an extreme problem, and saw teeth often broke completely. The method of the invention has totally eliminated these failures.

After the peening, the carbide tips 14 are ground in a manner well known to the art.

The method of the invention is applicable to any metal part wherein excessive hardness caused during interim steps in the manufacture thereof inhibits subsequent shot peening from producing a surface compression necessary to eliminate cracking or stress concentration failures. It is applicable at any point on a saw where welding or soldering increases the hardness locally, not just in the tooth and gullet areas. Use of the instant process will permit saws to be made of air hardened chrome molybdenum steels which could not heretofore be used because of the extreme cracking problem.

I claim:

1. In the manufacture of circular saws having carbide tips metal-joined to the periphery of a generally circular steel plate and wherein the metal in the gullet regions of said saws becomes excessively hard at least as a result of the metal-joining of the carbide tips and hence, subject to stress concentration failure, the improvement comprising:

heating the saw after the carbide tips have been metal-joined to the periphery thereof to reduce its hardness throughout to a hardness at which shot peening can achieve penetration of the metal surface; and then shot peening said saw at least in the gullet regions thereof to relieve surface tension therein and place the surface metal thereof in compression.

2. The method of claim 1 in which the peripheral region of said saw is glass bead peened.

3. The method of claim 2 in which said saw is glass bead peened simultaneously on opposite sides and on the peripheral edge thereof.

4. In the manufacture of carbide-tipped circular saws, the method comprising silver soldering carbide tips to the periphery of a circular steel plate; then heating the plate to reduce the hardness throughout to a hardness at which glass bead peening can achieve penetration of the steel surface; and then simultaneously glass bead peening the edge and at least the peripheral regions of the plate on opposite sides thereof to relieve surface tension and place the surface metal in compression, thereby to eliminate stress concentration and cracking failures in the tooth and gullet regions of the saw.

5. The method of claim 4 in which the steel plate is heated by
placing the same in a preheated oven;
raising the oven temperature to a temperature above the temperature at which the plate hardness is reduced to a hardness at which glass bead peening can achieve penetration of the steel surface; and then
slowly reducing the oven temperature at least to that of the preheated oven.

* * * * *